US010453162B2

(12) United States Patent
Olmstead

(10) Patent No.: US 10,453,162 B2
(45) Date of Patent: Oct. 22, 2019

(54) MONOCHROME IMAGING OF DIGITAL WATERMARKS IN WHITE LIGHT

(71) Applicant: Datalogic USA, Inc., Eugene, OR (US)

(72) Inventor: Bryan Olmstead, Eugene, OR (US)

(73) Assignee: Datalogic USA, Inc., Eugene, OR (US)

( * ) Notice: Subject to any disclaimer, the term of this patent is extended or adjusted under 35 U.S.C. 154(b) by 103 days.

(21) Appl. No.: 15/495,600

(22) Filed: Apr. 24, 2017

(65) Prior Publication Data

US 2017/0308987 A1  Oct. 26, 2017

Related U.S. Application Data

(60) Provisional application No. 62/326,412, filed on Apr. 22, 2016.

(51) Int. Cl.
  *G06T 1/00* (2006.01)
  *H04N 1/028* (2006.01)
  *H04N 1/32* (2006.01)

(52) U.S. Cl.
  CPC ........... *G06T 1/005* (2013.01); *G06T 1/0028* (2013.01); *H04N 1/02845* (2013.01); *H04N 1/32309* (2013.01); *G06T 2201/0065* (2013.01); *H04N 2201/0081* (2013.01)

(58) Field of Classification Search
  CPC ... G06T 1/00; G06T 2201/00; H04N 1/32144; H04N 1/3232; H04N 1/32331; H04N 2005/91335; H04N 21/23892
  See application file for complete search history.

(56) References Cited

U.S. PATENT DOCUMENTS

| | | | |
|---|---|---|---|
| 9,727,941 B1* | 8/2017 | Falkenstern | H04N 1/482 |
| 2004/0156111 A1* | 8/2004 | Roddy | G03C 11/02 359/618 |
| 2005/0063742 A1* | 3/2005 | Roddy | G03B 17/245 399/311 |
| 2013/0329006 A1* | 12/2013 | Boles | H04N 1/40056 348/42 |
| 2015/0156369 A1* | 6/2015 | Reed | H04N 1/32309 382/100 |
| 2015/0248603 A1* | 9/2015 | Lowenthal | G06K 19/06112 235/375 |
| 2017/0154254 A1* | 6/2017 | Crooks | G06K 7/10861 |
| 2018/0181786 A1* | 6/2018 | Gao | G06K 7/10742 |

* cited by examiner

*Primary Examiner* — Bobbak Safaipour
(74) *Attorney, Agent, or Firm* — Shook, Hardy & Bacon, L.L.P.

(57) ABSTRACT

A monochrome imager used in such systems as a scanner can detect watermarks that have been encoded in the color space or chrominance. Such watermarks are called chroma watermarks and are considered more reliable than the traditional classic watermarks, which are encoded based on luminance. The monochrome imager detects the chroma watermark, which has been illuminated with ambient white light from a blue light emitting diode (LED) coated with phosphor.

17 Claims, 3 Drawing Sheets

COOL WHITE  OSRAM OSLON LUW CN7N
WARM WHITE  OSRAM OSLON LCW CQ7P

MONOCHROME IMAGING OF DIGITAL WATERMARKS IN WHITE LIGHT

CROSS-REFERENCE TO RELATED APPLICATIONS

This application claims the benefit of U.S. Provisional Application No. 62/326,412, filed Apr. 22, 2016, entitled "Monochrome Imaging Of Digital Watermarks In White Light," the entirety of which is incorporated by reference.

STATEMENT REGARDING FEDERALLY SPONSORED RESEARCH OR DEVELOPMENT

Not applicable.

TECHNICAL FIELD

The present invention relates to scanning, digital imaging and watermarks. The present invention offers several practical applications in the technical arts, related to detecting watermarks.

BACKGROUND OF THE INVENTION

Typically, watermarks are read in white (ambient) light using a color imager that can discriminate the colors (Blue, Yellow, Red, Green, etc.). In addition, watermarks are read using a monochrome imager and monochrome illumination (typically red).

Watermarks encoded in the chroma space uses the chrominance component of an image's color space. In contrast, a classic watermark uses the luminance of an image. The classic watermark is detected based on the image's contrast. Typically, classic watermarks show up in black and white and the human eye is more sensitive to perceiving such watermarks. Chroma watermarks are more difficult to detect by the human eye due to the lack of color perceptibility.

BRIEF SUMMARY OF THE INVENTION

The present invention generally relates to the use of warm white LEDs and the exploitation of the blue/near UV component in the LEDs improve response of watermark reading libraries.

White light generated from blue LED with a phosphor coating is able to produce a spectrum with significant blue content. Color encoded digital watermarks are often encoded in the Green-Red plus Blue-Yellow color spaces. Monochrome imaging of watermarking typically uses monochrome illumination (typically red). But the strong blue component in a white light LED can be used to produce contrast in the Blue-Yellow portion of the digital watermark. This enables watermarks to be read in white LED light with a monochrome imager.

Additional objects, advantages, and novel features of the invention will be set forth in part in the description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

In a first aspect, a system for detecting a watermark is provided that includes a monochrome imager. The monochrome imager illuminates an item with white light produced by a blue light emitting diode (LED) containing a phosphor coating. The white light from the blue LED provides contrast in the blue-yellow color spectrum such that the watermark in the item is detected.

In a second aspect, a method for detecting a watermark is provided that includes illuminating an item with white ambient light emitted by a blue light emitting diode (LED) coated with phosphor. The white ambient light is emitted from the blue LED coated with phosphor. The blue LED is located in a device holding the blue LED in a manner such that the item is illuminated. The watermark is detected in the item with a monochrome imager such that the wavelength of the blue color from the blue LED causes a contrast to occur in the blue-yellow spectrum that makes the watermark detectable. The watermark was encoded in the chroma space.

In a third aspect, a scanning device for detecting a chroma watermark is provided that includes a monochrome imager that reads the chroma watermark in white light. The monochrome imager includes a blue light emitting diode (LED) coated with phosphor. The blue LED emits white light onto an object. The monochrome imager detects the chroma watermark in the object.

Figure 3:
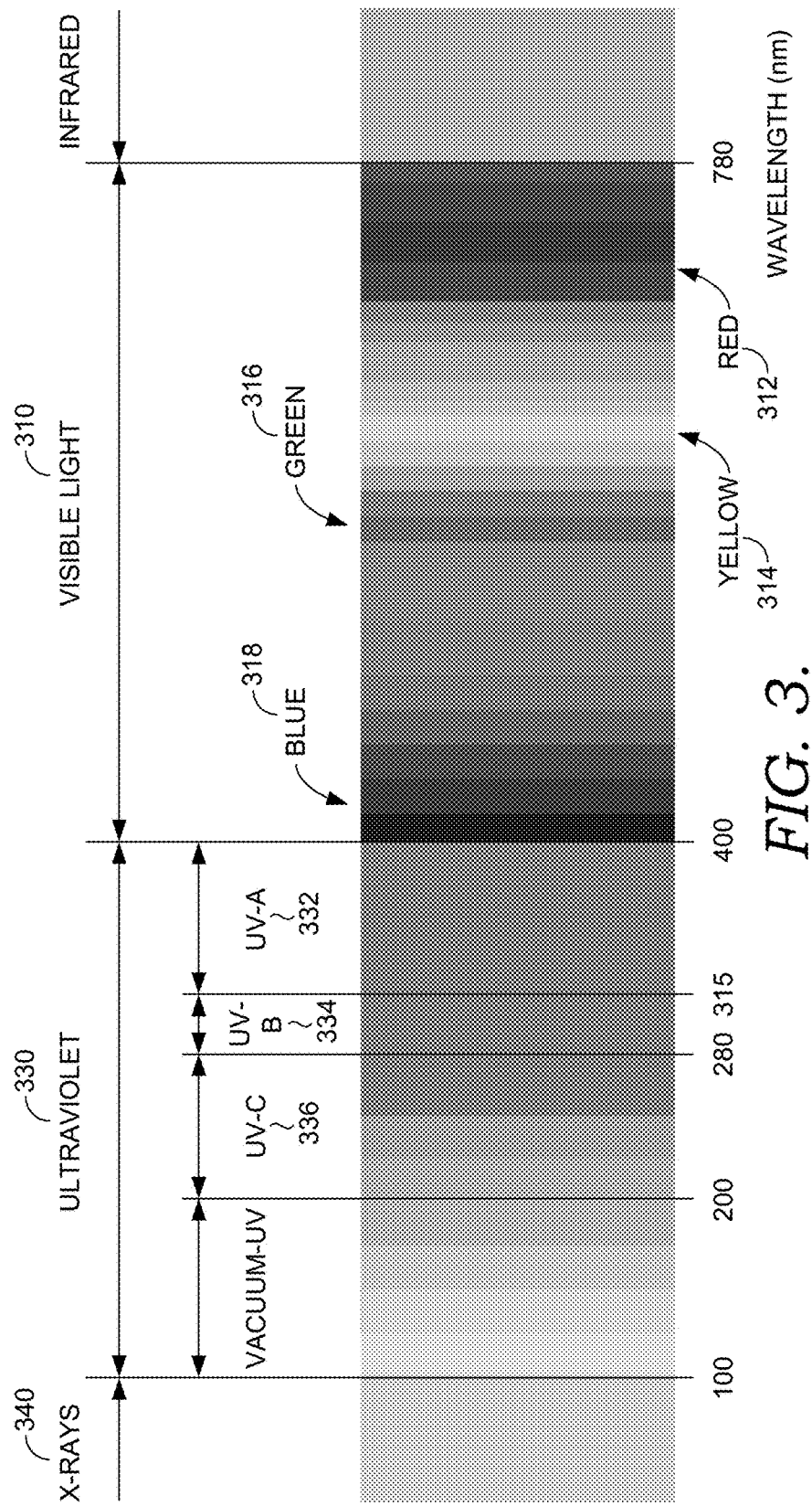
FIG. 3 is an illustration of the electromagnetic spectrum.

To provide an understanding of the impact of the spectrum of light and the corresponding wavelengths in light, FIG. 3 shows an illustration of electromagnetic spectrum of light. All light is categorized by wavelengths, shown in spectrum 300. Visible light 310 is that light which humans can see, and ranges between roughly 400 nanometers (nm) and 780 nm. Within visible light 310, a range of colors occurs from shades of red at red 312 to shades of yellow at yellow 314 to shades of green at green 316 to shades of blue at blue 318. The wavelengths of red 312 range approximately from 600 nm to 700 nm. The wavelengths of yellow 314 range approximately from 525 nm to 600 nm. The wavelengths of green 316 range approximately from 475 nm to 525 nm. The wavelengths of blue 318 range approximately from 400 nm to 475 nm. The wavelengths of each color are an approximation and one may find that the color ranges may be listed differently in other charts. The idea here is to show where the wavelengths for each color typically occur. Reds have higher wavelengths than yellows, which have higher wavelengths than greens, which have higher wavelengths than blues.

Continuing with FIG. 3, red 312 is closest to the infrared spectrum of light, which is shown as infrared 320. Humans ordinarily cannot see infrared 320. However, there are animals that can see into this spectrum and beyond. At the other end of visible light 310, blue 318 is closest to the ultraviolet light spectrum, shown as ultraviolet 330. Ultraviolet 330 ranges approximately from 100 nm to 400 nm and is divided into four sub-spectrums or groups. The first three sub-spectrums are respectively adjacent to blue 318 and are UV-A 332, UV-B 334, and UV-C 336. As one might expect, the wavelengths of these sub-spectrums get smaller as they move away from the visible light spectrum. Additionally, humans ordinarily cannot see ultraviolet 330, although some children and young adults can see down to 310 nm, which is in UV-B 334.

Adjacent to ultraviolet 330 is the X-rays light spectrum, shown as X-rays 340. X-rays 340 include light that is less than 100 nm.

A monochrome imager can read watermarks in while light as long as the white light has a strong monochrome component, which is typically blue. The monochrome imager can include devices such as a camera, image processing device, or scanner, to name a few.

Figure 1:
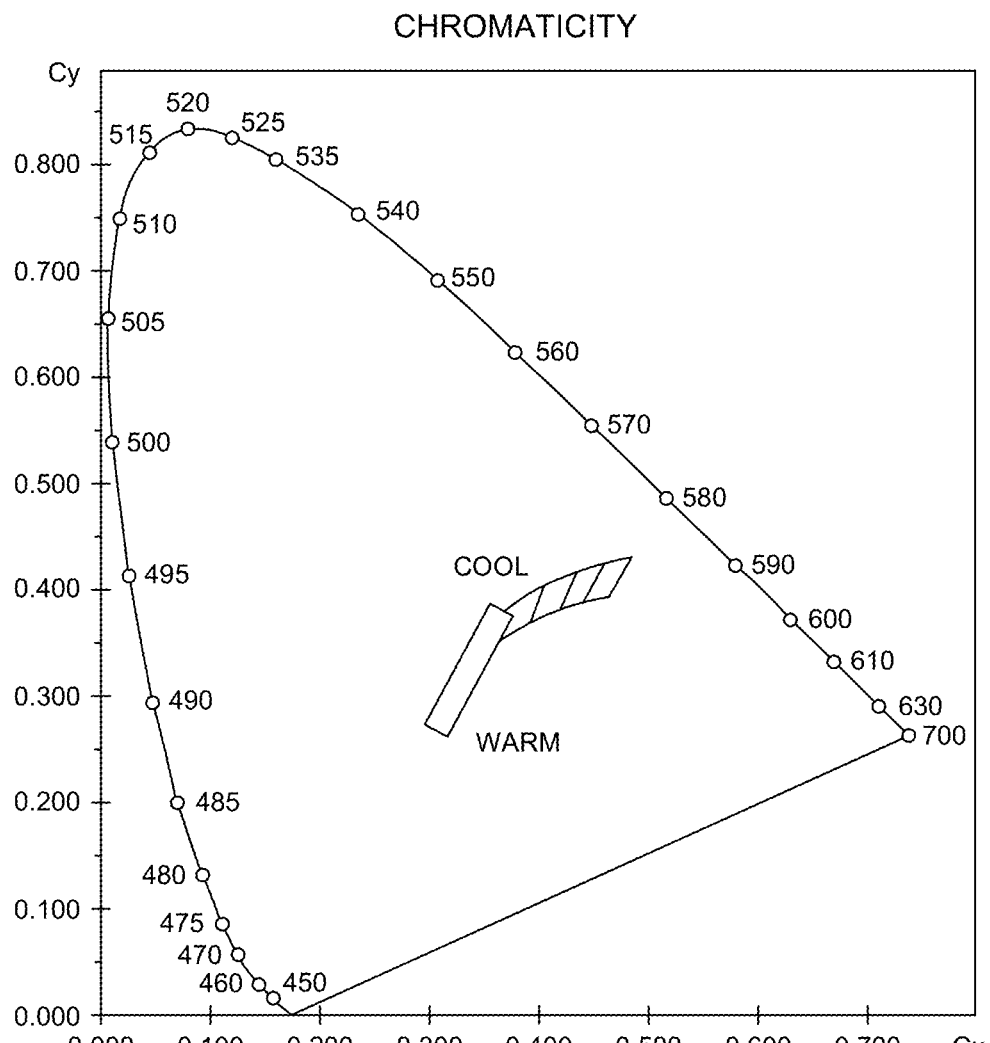
FIG. 1 is an illustration of the chromaticity of cool and warm LEDs.
Figure 2:
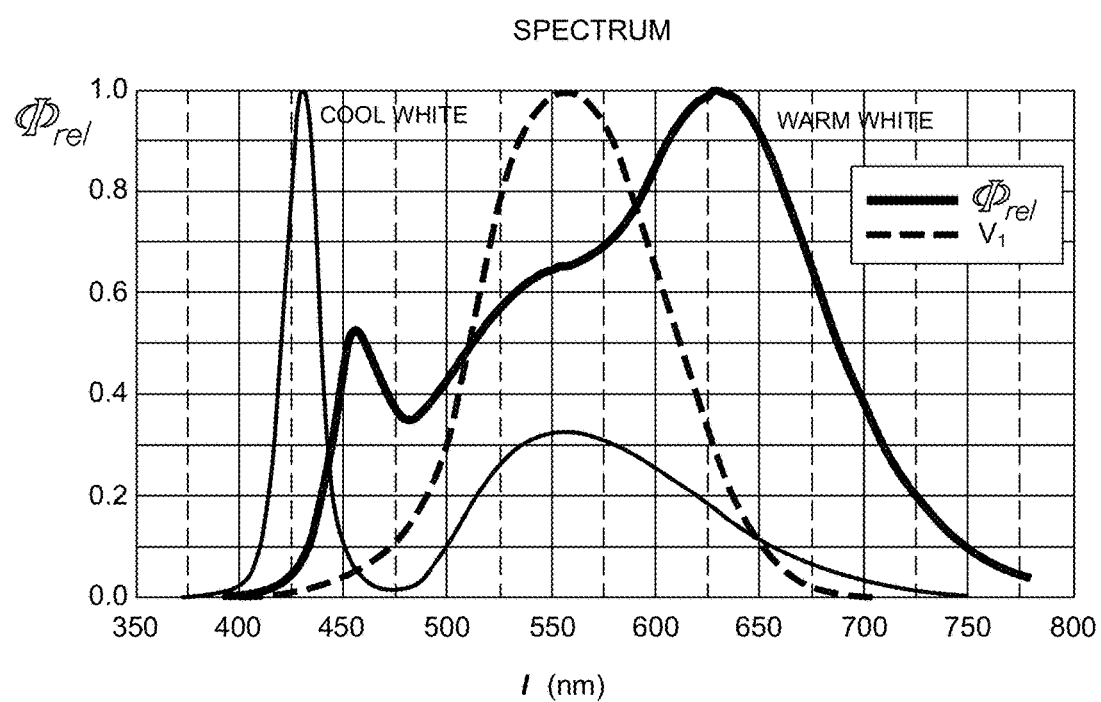
FIG. 2 is an illustration of the spectral response of cool and warm light LEDs.

FIG. 1 shows the chromaticity of warm and cool white light LEDs. Chromaticity is an objective specification of the quality of color as characterized by a dominant wavelength. Chrominance is the signal used to convey color information of a picture. The warm white light LEDs are generated from a blue LED with a phosphor, which is typically yellow. The blue LED wavelength and shift toward red emission in the phosphor creates the warm white LED as shown in FIG. 2. Particularly, the mixture of the different wavelengths of lights creates a light that looks white and ambient to the human eye.

LED stands for light emitting diode. The light from an LED tends to be white or white in color. In order to achieve white light in an LED, two techniques can be used. One technique is called the mixed-color white light. This technique mixes the colors emitted by red, green, and blue LEDs. By locating the three LEDs close together, the three colors mix together to produce color that is white in appearance. Another technique to produce white light from LEDs is called phosphor-converted white light. Phosphor material can be incorporated into a blue LED. When the blue LED is illuminated, yellow light is emitted with a broad spectral power distribution. Blue light is also emitted from the nature of the blue LED. The yellow light and blue light mix together, resulting in a broad-spectrum white light. Simply put, a blue LED coated with a phosphor of a different color can yield white light. In many cases, the blue LEDs are made of Indium Gallium Nitride (InGAN).

Chroma watermarks modify the intensity of Red and Green in an opposite fashion so that the signal Red-Green detects watermark data. Chroma is that portion of an analog or digital signal that carries color information. Human visual perception is limited for this type of modification. So, the watermark appears invisible. Furthermore, chroma watermarks often encode the same data in the Blue-Yellow color space as well, by modifying the intensity of Blue and Yellow in an opposite fashion. So, a total watermark signal is decoded by (Red-Green)+(Blue-Yellow) or some linear combination to that effect.

Watermarks are typically decoded in ambient light with a color imager. All colors are imaged of the target and the chroma computation is performed to detect the watermark data. Alternatively, a monochrome imager can be used with monochrome light (typically generated from the reader device). A common method (used in the MAGELLAN 9800i by Datalogic ADC of Eugene, Oreg.) is to illuminate with red light and read the image with a monochrome imager. The red signal is received with high transmission and the green signal is attenuated. Therefore, the watermark information in the Red-Green signal is detected. There is no excitation of the Blue or Yellow data. So, the Blue-Yellow channel provides little contrast.

Embodiments of the invention use the strong blue illumination present in a white light LED to provide illumination to read the Blue-Yellow channel of the watermark encoding. So, watermark decoding with a monochrome imager can be accomplished in a manner similar to monochrome illumination. The action of the phosphor presents an ambient light noise source that lowers the signal-to-noise ratio of the resultant signal. Therefore, the signal level of this part of the spectrum needs to be sufficiently low. The cool white LED spectrum of FIG. 2 seems ideal for this purpose. There is a strong Blue signal and relatively weak Yellow signal, thus allowing the measurement of Blue-Yellow to have sufficient contrast for decoding. The Red-Green channel in this case would provide little contrast and not add to the decoding.

The warm white LED may be more challenging. The Blue-Yellow channel is of similar amplitude, so will probably not provide much contrast. The Red illumination is significant compared to Green. So, the contrast of the Red-Green channel might be sufficient for decoding.

Depending on the spectrum of illumination source, the measured signal (Red-Green)+(Blue-Yellow) may have sufficient contrast to read digital watermarks even with a monochrome imager.

The use of a monochrome imager with a blue LED coated with phosphor to detect a chroma watermark led to an unexpected result. Color imagers are used to detect and discriminate colors, especially blue, yellow, red, and green. Monochrome imagers are used to detect a classic watermark. Typically, the monochrome illumination from a monochrome imager is red in color. As a result, the use of a monochrome imager using the illumination of the blue LED coated with phosphor provides a way to detect watermarks that have been encoded in the color region (i.e. chrominance) as opposed to luminance. The detection occurs in ambient white light. It is definitely unexpected that one would think of using a monochrome imager that can detect and discriminate color. However, by illuminating an area, the watermark can be detected from the color contrast in the spectrum.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described in the invention, what is claimed is:

1. A method for detecting a watermark, comprising:
   illuminating an item with white ambient light emitted by a blue light emitting diode (LED) coated with phosphor, the item including a watermark that is encoded in a color space;
   emitting the white ambient light from the blue LED coated with phosphor, wherein the blue LED is located in a device holding the blue LED in a manner such that the item is illuminated; and
   detecting the watermark in the item with a monochrome imager based on contrast in at least a blue-yellow spectrum of the white ambient light emitted by the blue LED coated with phosphor.

2. The method of claim 1, wherein the contrast is detected by the monochrome imager based on chrominance of the watermark as illuminated.

3. The method of claim 2, further comprising the monochrome imager decoding data of the watermark that is encoded in at least one of a red-green channel or a blue-yellow channel.

4. The method of claim 1, wherein the blue LED containing the phosphor coating of the monochrome imager produces white ambient light having a cool chromaticity.

5. The method of claim 4, wherein detecting the watermark with the monochrome imager includes detecting contrast in at least the blue-yellow channel of the white ambient light based on the illumination of the watermark with the white light having a cool chromaticity produced by the blue LED containing the phosphor coating.

6. The method of claim 1, wherein the blue LED containing the phosphor coating of the monochrome imager produces white ambient light having a warm chromaticity.

7. The method of claim 6, wherein detecting the watermark with the monochrome imager includes detecting contrast in at least a red-green channel of the white ambient light based on the illumination of the watermark with the white ambient light having a warm chromaticity produced by the blue LED containing the phosphor coating.

8. The method of claim 1, wherein detecting the watermark in the item with a monochrome imager based on contrast in at least the blue-yellow spectrum of the white ambient light emitted by the blue LED coated with phosphor further comprises:
measuring signal strength in at least one of a red signal, a green signal, a blue signal, and a yellow signal.

9. The method of claim 8, wherein a difference measured between signal strength of a blue signal relative to a yellow signal is used to detect contrast in at least the blue-yellow spectrum.

10. The method of claim 1, further comprising:
when the watermark that is encoded in the color space is detected via the monochrome imager, decoding the watermark.

11. The method of claim 1, further comprising:
when contrast in at least the blue-yellow spectrum of the white ambient light is not detectable, detecting the watermark in the item with the monochrome imager based on contrast in a red-green spectrum of the white ambient light emitted by the blue LED coated with phosphor.

12. A scanning device for detecting a chroma watermark, the scanning device comprising:
a blue light emitting diode (LED) coated with phosphor configured to emit white light to illuminate an object having a chroma watermark encoded in a color space; and
a monochrome imager configured to detect the chroma watermark based on a contrast in at least a blue-yellow spectrum of the white light emitted by the blue LED coated with phosphor.

13. The scanning device of claim 12, wherein the monochrome imager is configured to detect contrast by measuring relative signal strength between a blue signal and a yellow signal.

14. The scanning device of claim 12, wherein the monochrome imager is configured to detect contrast in a red-green spectrum of the white light emitted by the blue LED coated with phosphor.

15. The scanning device of claim 14, wherein the monochrome imager is configured to detect contrast by measuring relative signal strength between a red signal and a green signal.

16. The scanning device of claim 12, wherein the scanning device is configured to decode the watermark responsive to the chroma watermark being detected by the monochrome imager.

17. The scanning device of claim 12, wherein the chroma watermark is encoded in at least one of a red-green channel or blue-yellow channel.

\* \* \* \* \*